(12) United States Patent
An

(10) Patent No.: US 10,072,965 B2
(45) Date of Patent: Sep. 11, 2018

(54) DEVICE FOR MEASURING WEIGHT ON BOARD BY MEASURING THE ANGLE OF ROTATION OF THE LEAF SPRING SUPPORTING SHACKLE

(71) Applicant: Hyundai Motor Company, Seoul (KR)

(72) Inventor: Chiyoung An, Cheongju-si (KR)

(73) Assignee: Hyundai Motor Company, Seoul (KR)

( * ) Notice: Subject to any disclaimer, the term of this patent is extended or adjusted under 35 U.S.C. 154(b) by 179 days.

(21) Appl. No.: 15/271,037

(22) Filed: Sep. 20, 2016

(65) Prior Publication Data

US 2017/0205273 A1 Jul. 20, 2017

(30) Foreign Application Priority Data

Jan. 18, 2016 (KR) .......................... 10-2016-0006133

(51) Int. Cl.
| | |
|---|---|
| *G01G 3/08* | (2006.01) |
| *G01G 3/10* | (2006.01) |
| *G01G 19/02* | (2006.01) |
| *G01G 19/12* | (2006.01) |
| *G01L 1/00* | (2006.01) |
| *G01B 5/24* | (2006.01) |
| *G01G 19/08* | (2006.01) |
| *G01L 3/00* | (2006.01) |

(52) U.S. Cl.
CPC ............. *G01G 19/028* (2013.01); *G01B 5/24* (2013.01); *G01G 3/08* (2013.01); *G01G 3/10* (2013.01); *G01G 19/08* (2013.01); *G01G 19/12* (2013.01); *G01L 1/00* (2013.01); *G01L 3/00* (2013.01)

(58) Field of Classification Search
CPC ........ G01G 3/10; G01G 19/028; G01G 19/12; G01G 3/08; G01G 19/08; G01L 1/00; G01L 3/00; G01B 5/24
USPC ......................................................... 177/137
See application file for complete search history.

(56) References Cited

U.S. PATENT DOCUMENTS 1,294,298 A * 2/1919 Moulton ................. G01G 19/08
177/137
1,689,978 A * 10/1928 Swartley ................. G01G 19/08
177/137
(Continued)

FOREIGN PATENT DOCUMENTS

JP 2007-315920 A 12/2007
KR 10-0774652 B1 11/2007
(Continued)

*Primary Examiner* — Randy Gibson
(74) *Attorney, Agent, or Firm* — Morgan, Lewis & Bockius LLP

(57) ABSTRACT

A device for measuring weight on board may include a sensor mounter coupled to a shackle, a first motor mounted to have a same rotation center as a first rotation center of the shackle being connected to the vehicle body, a second motor mounted to have a same rotation center as a second rotation center of the shackle being connected to an eye of the spring, a first angle sensor rotating by receiving torque of the first motor, and a second angle sensor rotating by receiving torque of the second motor, in which a rotation angle of the shackle about the first rotation center may be measured by the first angle sensor, and a rotation angle of the shackle about the second rotation center may be measured by the second angle sensor, and weight on board may be measured depending on variation of the rotation angle of the shackle.

8 Claims, 5 Drawing Sheets

(56) References Cited

U.S. PATENT DOCUMENTS

| | | | | |
|---|---|---|---|---|
| 2,106,652 A | * | 1/1938 | Pinson | B60Q 9/00 |
| | | | | 177/137 |
| 3,092,818 A | * | 6/1963 | Potschka | G01G 19/12 |
| | | | | 177/137 |
| 3,151,692 A | * | 10/1964 | Dysart | G01G 19/12 |
| | | | | 177/138 |
| 3,247,917 A | * | 4/1966 | Balke | G01G 19/08 |
| | | | | 177/137 |
| 3,480,095 A | * | 11/1969 | Tuchman | G01G 19/08 |
| | | | | 177/137 |
| 3,771,614 A | * | 11/1973 | Kerr | G01G 3/02 |
| | | | | 177/137 |
| 3,934,663 A | * | 1/1976 | Johansson | G01G 19/12 |
| | | | | 177/137 |
| 4,917,197 A | * | 4/1990 | Waite, Jr. | G01G 19/12 |
| | | | | 177/137 |
| 5,376,760 A | * | 12/1994 | Horsley | G01G 19/08 |
| | | | | 177/137 |
| 7,141,746 B1 | * | 11/2006 | Scott | G01G 19/08 |
| | | | | 177/137 |
| 7,612,303 B1 | * | 11/2009 | Floyd | G01G 19/10 |
| | | | | 177/141 |

FOREIGN PATENT DOCUMENTS

| | | |
|---|---|---|
| KR | 10-1519237 B1 | 5/2015 |
| WO | WO 03/044472 A1 | 5/2003 |

\* cited by examiner

DEVICE FOR MEASURING WEIGHT ON BOARD BY MEASURING THE ANGLE OF ROTATION OF THE LEAF SPRING SUPPORTING SHACKLE

CROSS-REFERENCE TO RELATED APPLICATION

The present application claims priority to Korean Patent Application No. 10-2016-0006133, filed Jan. 18, 2016, the entire contents of which is incorporated herein for all purposes by this reference.

BACKGROUND OF THE INVENTION

Field of the Invention

The present invention relates to a device for measuring weight on board. More particularly, the present invention relates to a device for measuring weight on board by which weight of a cargo loaded to a vehicle can be exactly measured.

Description of Related Art

Generally, a device for measuring weight of loaded cargo, namely weight on board, is provided to a cargo vehicle for loading and transporting a cargo.

A method of measuring weight of a cargo vehicle not loaded with cargo and then measuring weight of the cargo vehicle loaded with cargo may be used for measuring weight of cargo loaded to a cargo vehicle, but a device for measuring weight on board is provided to a recent cargo vehicle.

Recently, a device for exactly measuring weight on board has been required, and a device by which weight on board is measured depending on spring camber of a leaf spring has been provided on recent cargo vehicles.

However, maximum weight which can be loaded to a cargo vehicle may vary and measurement errors with respect to spring camber of a leaf spring may occur according to senescence of components of the cargo vehicle. Thus, as an error of measuring weight on board occurs, and if the error is excessive, risk of accidents due to weight on board exceeding a maximum design weight may be generated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a device for measuring weight on board having advantages of exactly measuring weight on board.

According to various aspects of the present invention, a device for measuring weight on board, by measuring an angle of a shackle which is configured so that both ends thereof are respectively supported by a vehicle body and a leaf spring to be rotatable, may include a sensor mounter coupled to the shackle, a first motor mounted to a surface facing an open surface at the sensor mounter to have a same rotation center as a first rotation center of the shackle being connected to the vehicle body, the first motor generating torque, a second motor mounted to a surface facing the open surface at the sensor mounter to have a same rotation center as a second rotation center of the shackle being connected to an eye of the spring, the second motor generating torque, a first angle sensor rotating by receiving the generated torque of the first motor, and a second angle sensor rotating by receiving the generated torque of the second motor, in which a rotation angle of the shackle about the first rotation center may be measured by the first angle sensor, and a rotation angle of the shackle about the second rotation center may be measured by the second angle sensor, and weight on board may be measured depending on an amount of variation of the rotation angle of the shackle.

The first angle sensor may be disposed on a line connecting the first rotation center of the shackle and the rotation center of the first motor, and the second angle sensor may be disposed on a line connecting the second rotation center of the shackle and the rotation center of the second motor.

The device may further include a first rotation angle reference point marked on the first angle sensor as a reference point such that the first angle sensor measures the rotation angle of the shackle about the first rotation center, and a second rotation angle reference point marked on the second angle sensor as a reference point such that the second angle sensor measures the rotation angle of the shackle about the second rotation center.

When the rotation angle of the shackle rotating around the first rotation center is a first shackle angle and the rotation angle of the shackle rotating around the second rotation center is a second shackle angle, the first shackle angle and the second shackle angle may be measured at a position where the first rotation angle reference point and the second rotation angle reference point face each other.

Angles at which the first angle sensor and the second angle sensor rotate to a position where the first rotation angle reference point and the second rotation angle reference point face each other may respectively be the first shackle angle and the second shackle angle, when the first angle sensor rotates clockwise from a state in which the first rotation angle reference point is positioned at a right side with respect to the first rotation center on a first horizontal line passing through the first rotation center and the second angle sensor rotates clockwise from a state in which the second rotation angle reference point is positioned at a left side with respect to the second rotation center on a second horizontal line passing through the second rotation center.

When the first shackle angle in an initial weight is a first initial angle and the first shackle angle in a result weight is a first resultant angle, the weight on board may be determined by an angle difference between the first initial angle and the first resultant angle.

When the second shackle angle in an initial weight is a second initial angle and the second shackle angle in a result weight is a second resultant angle, the weight on board may be determined by an angle difference between the second initial angle and the second resultant angle.

The sensor mounter may be formed in a "U" beam shape such that the shackle is coupled to the open surface at the sensor.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
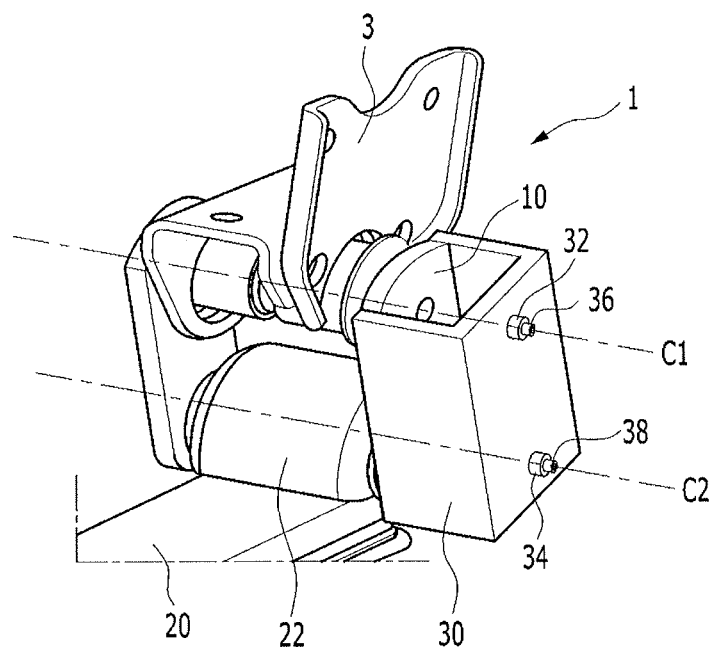
FIG. 1 is a perspective view of a device for measuring weight on board according to various embodiments of the present invention.
Figure 2:
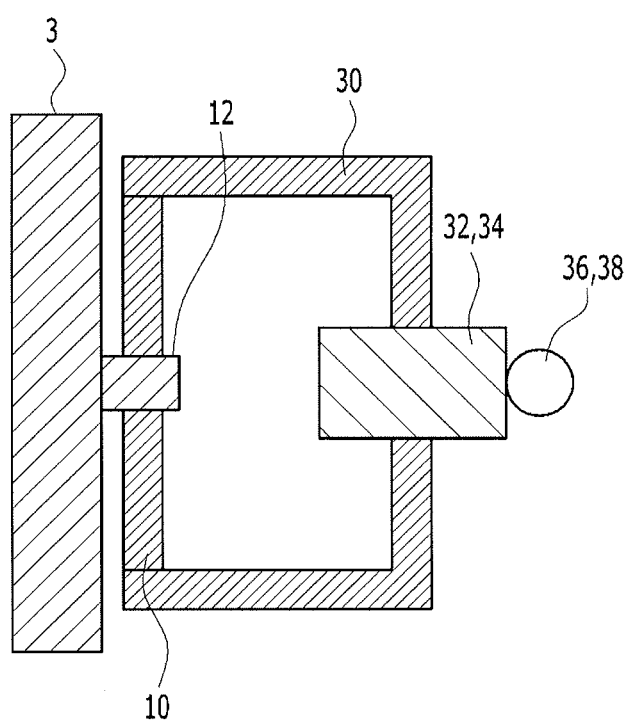
FIG. 2 is a sectional schematic diagram of a device for measuring weight on board according to various embodiments of the present invention.

FIG. 1 is a perspective view of a device for measuring weight on board according to various embodiments of the present invention, and FIG. 2 is a sectional schematic diagram of a device for measuring weight on board according to various embodiments of the present invention.

As shown in FIG. 1 and FIG. 2, a device 1 for measuring weight on board according to various embodiments of the present invention is mounted to a shackle 10 which is configured so that one end thereof is rotatably supported by a bracket 3 which is fixed to a vehicle body 5, and the other end thereof is rotatably connected with a spring eye 22 of a leaf spring 20.

In various embodiments, the shackle 10 is provided such that it is possible to vary a span which is a distance between the spring eye 22 of the leaf spring 20 and a center of the spring eye 22, and the leaf spring 20 and the shackle 10 are well known to a person of ordinary skill in the art, so detailed description thereof will be omitted.

The device 1 for measuring weight on board according to various embodiments of the present invention includes a sensor mounter 30, a first motor 32, a second motor 34, a first angle sensor 36, and a second angle sensor 38.

The sensor mounter 30 is formed in a "U" beam shape in which one surface thereof is opened such that the shackle 10 is coupled to the one opened surface. The shackle 10 is coupled to one opened surface of the sensor mounter 30 so as to form a tetragonal beam shape.

The first motor 32 functions as an actuator for generating a torque. The first motor 32 is mounted to a surface to face the one opened surface on the sensor mounter 30. Further, the first motor 32 is disposed so that a rotation center C1 thereof is equal to a rotation center C1 of the shackle 10 which is connected with the bracket 3. That is, the first motor 32 has a center C1 that is the same as that of a fastening member 12 which engages the bracket 3 with the shackle 10. Herein, the rotation center C1 of the shackle 10 connected with the bracket 3 will be referred to as a "first rotation center C1".

The second motor 34 functions as an actuator for generating a torque. In addition, the second motor 34 is mounted to a surface to face the one opened surface on the sensor mounter 30. Further, the second motor 34 is disposed so that a rotation center C2 thereof is the same as a rotation center C2 of the shackle 10 which is connected with the spring eye 22. That is, the second motor 34 has a center C2 that is the same as that of a fastening member 12 which engages the spring eye 22 with the shackle 10. Herein, the rotation center C2 of the shackle 10 connected with the spring eye 22 will be referred to as a "second rotation center C2".

The first angle sensor 36 rotates by receiving torque of the first motor 32. In addition, the first angle sensor 36 is disposed at a rotating shaft of the first motor 32 on a line connecting the first rotation center C1 of the shackle 10 and the rotation center C1 of the first motor 32.

The second angle sensor 38 rotates by receiving torque of the second motor 34. In addition, the second angle sensor 38 is disposed at a rotating shaft of the second motor 34 on a line connecting the second rotation center C2 of the shackle 10 and the rotation center C2 of the second motor 34.

Figure 3:
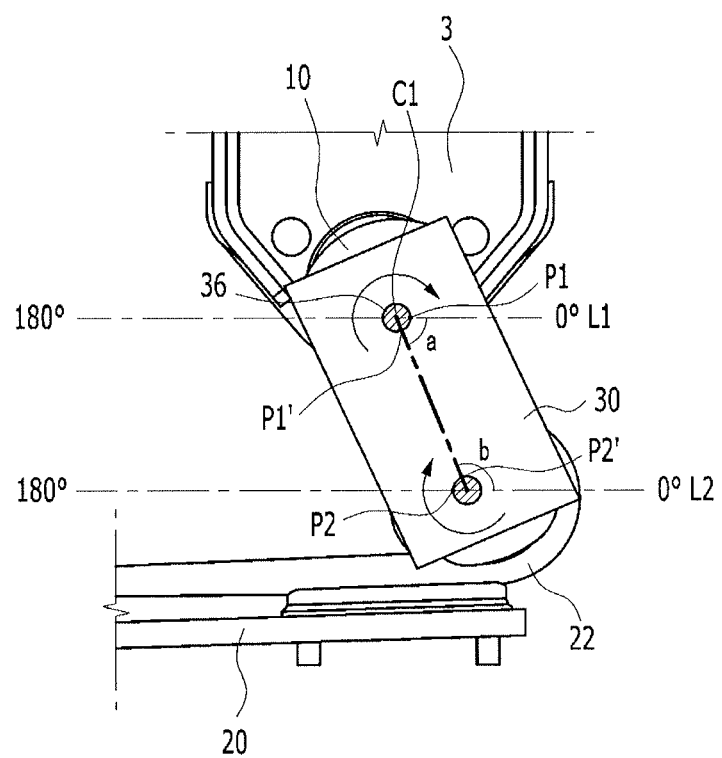
FIG. 3 is a front view of a device for measuring weight on board showing a method for measuring a shackle angle according to various embodiments of the present invention.

FIG. 3 is a front view of a device for measuring weight on board showing a method for measuring shackle angle according to various embodiments of the present invention.

As shown in FIG. 3, the device for measuring weight on board according to various embodiments of the present invention further includes first and second rotation angle reference points P1 and P2.

The first rotation angle reference point P1 is a point marking a reference point for the first angle sensor 36 to measure a rotation angle of the shackle 10 about the first rotation center C1. Herein, the rotation angle of the shackle 10 which rotates around the first rotation center C1 will be referred to as a "first shackle angle a," an initial angle thereof will be referred to as a "first initial angle a1," and a resultant angle thereof will be referred to as a "first resultant angle a2". In addition, the first rotation angle reference point P1 may be marked on the first angle sensor 36.

The second rotation angle reference point P2 is a point marking a reference point for the second angle sensor 38 to measure a rotation angle of the shackle 10 about the second rotation center C2. Herein, the rotation angle of the shackle 10 which rotates around the second rotation center C2 will be referred to as a "second shackle angle b," an initial angle thereof will be referred to as a "second initial angle b1," and a resultant angle thereof will be referred to as a "second resultant angle b2." In addition, the second rotation angle reference point P2 may be marked on the second angle sensor 38.

When the first rotation angle reference point P1 of the first angle sensor 36 is positioned at a right side with respect to the first rotation center C1 on a first horizontal line L1 which passes the first rotation center C1, the first shackle angle a, which is recognized by the first angle sensor 36, is 0 degrees. From this state, when the first rotation angle reference point P1 is positioned at a left side with respect to the first rotation center C1 on the first horizontal line L1 which passes the first rotation center C1 as the first angle sensor 36 rotates clockwise, the first shackle angle a, which is recognized by the first angle sensor 36, is 180 degrees. In addition, the first shackle angle a substantially has a range of an acute angle.

When the second rotation angle reference point P2 of the second angle sensor 38 is positioned at a left side with respect to the second rotation center C2 on a second horizontal line L2 which passes through the second rotation center C2, the second shackle angle b, which is recognized by the second angle sensor 38, is 180 degrees. From this state, when the second rotation angle reference point P2 is positioned at a right side with respect to the second rotation center C2 on the second horizontal line L2 which passes through the second rotation center C2 as the second angle sensor 38 rotates clockwise, the second shackle angle b, which is recognized by the second angle sensor 38, is 0 degrees. That is, the second shackle angle b is obtained by subtracting the rotation angle of the second angle sensor 38 from 180 degrees. In addition, the second shackle angle b substantially has a range of an obtuse angle.

When the first rotation angle reference point P1 and the second rotation angle reference point P2 face each other, the first shackle angle a and the second shackle angle b are measured. That is, on one phase of the shackle 10, there is one position which is adapted such that the first rotation angle reference point P1 and the second rotation angle reference point P2 face each other. In FIG. 3, the points when the first rotation angle reference point P1 and the second rotation angle reference point P2 face each other are illustrated as P1' and P2'.

Figure 4:
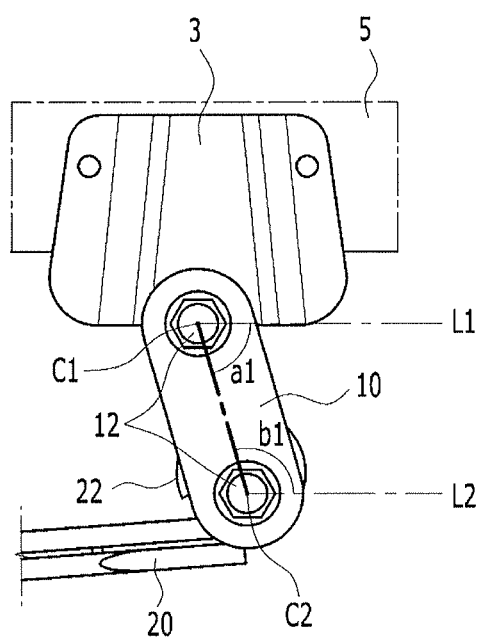
FIG. 4 is a front view of a device for measuring weight on board showing a state of an initial shackle angle according to various embodiments of the present invention.
Figure 5:
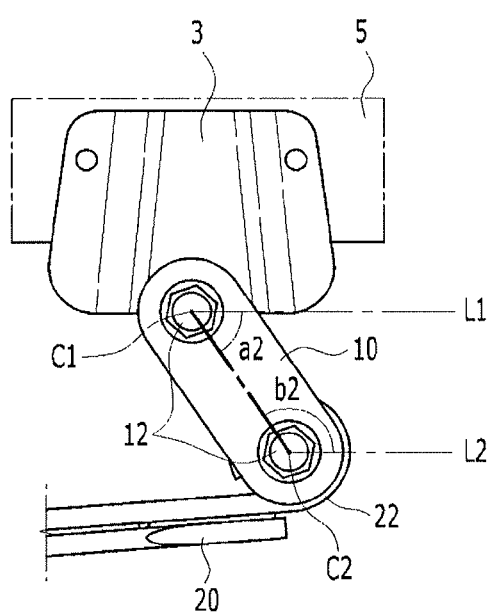
FIG. 5 is a front view of a device for measuring weight on board showing a state of a resultant shackle angle according to various embodiments of the present invention.

FIG. 4 is a front view of a device for measuring weight on board showing a state of an initial shackle angle according to various embodiments of the present invention, and FIG. 5 is a front view of a device for measuring weight on board showing a state of a resultant shackle angle according to various embodiments of the present invention.

In FIG. 4 and FIG. 5, the sensor mounter 30, the first and second motors 32 and 34, and the first and second angle sensors 36 and 38 are omitted.

As shown in FIG. 4, when the shackle 10 is positioned at an initial position, one position where the first rotation angle reference point P1 and the second rotation angle reference point P2 face each other exists in a case that the first angle sensor 36 rotates clockwise from the position where the first shackle angle a is 0 degrees and the second angle sensor 38 rotates clockwise from the position where the second shackle angle b is 180 degrees. At the position where the first rotation angle reference point P1 and the second rotation angle reference point P2 face each other when the shackle 10 is positioned on the initial position, the first shackle angle a, which is recognized by the first angle sensor 36, is the first initial angle a1, and the second shackle angle b, which is recognized by the second angle sensor 38, is the second initial angle b1. Herein, the initial position of the shackle 10 may be a position before loading cargo to a cargo vehicle or after firstly loading cargo to a cargo vehicle for measuring secondary weight on board.

As shown in FIG. 5, when the shackle 10 is positioned at a resultant position, one position where the first rotation angle reference point P1 and the second rotation angle reference point P2 face each other exists in a case that the first angle sensor 36 rotates clockwise from the position where the first shackle angle a is 0 degrees and the second angle sensor 38 rotates clockwise from the position where the second shackle angle b is 180 degrees. At the position where the first rotation angle reference point P1 and the second rotation angle reference point P2 face each other when the shackle 10 is positioned at the resultant position, the first shackle angle a, which is recognized by the first angle sensor 36, is the first resultant angle a2, and the second shackle angle b, which is recognized by the second angle sensor 38, is the second resultant angle b2. Herein, the resultant position of the shackle 10 may be a position after lastly loading cargo to a cargo vehicle.

Meanwhile, at the position where the first rotation angle reference point P1 and the second rotation angle reference point P2 face each other, a sum of the first initial angle a1 and the second initial angle b1 and a sum of the first resultant angle a2 and the second resultant angle b2 are to be 180 degrees according to the principle of alternate angles. Therefore, the rotation angle of the first angle sensor 36 and the rotation angle of the second angle sensor 38 are equal, and if the rotation of the first angle sensor 36 and the rotation of the second angle sensor 38 are simultaneously begun respectively from the position where the first shackle angle a is 0 degrees and the position where the second shackle angle b is 180 degrees, and rotation speeds of the first angle sensor 36 and the second angle sensor 38 are the same, the first rotation angle reference point P1 and the second rotation angle reference point P2 simultaneously reach the position of facing each other.

Weight on board may be calculated by the angle difference between the first initial angle a1 and the first resultant angle a2, or the angle difference between the second initial angle b1 and the second resultant angle b2 by using the above-mentioned method.

According to various embodiments of the present invention, as weight on board is calculated by comparing the initial angles a1 and b1 and the resultant angles a2 and b2 of the shackle 10 which are detected by the angle sensors 36 and 38, it is possible to exactly measure weight on board. In addition, as zero-point correction of two angle sensors 36 and 38 is performed before loading cargo and an initial angle of the shackle 10 is previously determined, an error of measuring weight on board according to senescence of components for a cargo vehicle may be prevented.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for measuring weight on board, by measuring an angle of a shackle which is configured so that both ends thereof are respectively supported by a vehicle body and a leaf spring to be rotatable, comprising:
- a sensor mounter coupled to the shackle;
- a first motor mounted to a surface facing an open surface at the sensor mounter to have a same rotation center as a first rotation center of the shackle being connected to the vehicle body, the first motor generating torque;
- a second motor mounted to a surface facing the open surface at the sensor mounter to have a same rotation center as a second rotation center of the shackle being connected to an eye of the spring, the second motor generating torque;
- a first angle sensor rotating by receiving the generated torque of the first motor; and
- a second angle sensor rotating by receiving the generated torque of the second motor,
- wherein a rotation angle of the shackle about the first rotation center is measured by the first angle sensor, and a rotation angle of the shackle about the second rotation center is measured by the second angle sensor, and
- weight on board is measured depending on an amount of variation of the rotation angle of the shackle.

2. The device of claim 1, wherein the first angle sensor is disposed on a line connecting the first rotation center of the shackle and the rotation center of the first motor, and the second angle sensor is disposed on a line connecting the second rotation center of the shackle and the rotation center of the second motor.

3. The device of claim 1, further comprising:
- a first rotation angle reference point marked on the first angle sensor as a reference point such that the first angle sensor measures the rotation angle of the shackle about the first rotation center; and
- a second rotation angle reference point marked on the second angle sensor as a reference point such that the second angle sensor measures the rotation angle of the shackle about the second rotation center.

4. The device of claim 3, wherein when the rotation angle of the shackle rotating around the first rotation center is a first shackle angle and the rotation angle of the shackle rotating around the second rotation center is a second shackle angle, the first shackle angle and the second shackle angle are measured at a position where the first rotation angle reference point and the second rotation angle reference point face each other.

5. The device of claim 4, wherein angles at which the first angle sensor and the second angle sensor rotate to a position where the first rotation angle reference point and the second rotation angle reference point face each other are respectively the first shackle angle and the second shackle angle, when the first angle sensor rotates clockwise from a state in which the first rotation angle reference point is positioned at a right side with respect to the first rotation center on a first horizontal line passing through the first rotation center and the second angle sensor rotates clockwise from a state in which the second rotation angle reference point is positioned at a left side with respect to the second rotation center on a second horizontal line passing through the second rotation center.

6. The device of claim 4, wherein when the first shackle angle in an initial weight is a first initial angle and the first shackle angle in a result weight is a first resultant angle, the weight on board is determined by an angle difference between the first initial angle and the first resultant angle.

7. The device of claim 4, wherein when the second shackle angle in an initial weight is a second initial angle and the second shackle angle in a result weight is a second resultant angle, the weight on board is determined by an angle difference between the second initial angle and the second resultant angle.

8. The device of claim 1, wherein the sensor mounter is formed in a "U" beam shape such that the shackle is coupled to the open surface at the sensor.

* * * * *